United States Patent [19]

Kress

[11] 4,419,578
[45] Dec. 6, 1983

[54] SOLID STATE NEUTRON DETECTOR

[75] Inventor: Kenneth A. Kress, Falls Church, Va.

[73] Assignee: United States of America, Washington, D.C.

[21] Appl. No.: 281,255

[22] Filed: Jun. 15, 1981

[51] Int. Cl.³ .............................................. G01T 3/08
[52] U.S. Cl. .................................... 250/390; 250/370; 250/391; 357/29; 357/59; 357/15
[58] Field of Search ................ 250/390, 370, 371, 391, 250/392; 357/29, 59, 15 R

[56] References Cited

U.S. PATENT DOCUMENTS

| | | | |
|---|---|---|---|
| 3,129,329 | 4/1964 | Love et al. | 250/370 |
| 3,225,198 | 12/1965 | Mayer | 357/29 |
| 3,581,091 | 5/1971 | Meijer | 250/390 |
| 3,598,997 | 8/1971 | Baertsch | 250/370 |
| 3,624,399 | 11/1971 | Den Boer | 357/15 |
| 4,200,473 | 4/1980 | Carlson | 357/15 |

OTHER PUBLICATIONS

Gverdtsiteli, "High-Efficiency Ion-Implanted Semiconductor Counter for Neutrons", Pribosyi Tekhnika Eksperimenta, No. 3, May–Jun. 1979, pp. 81–83, Plenum Pub. Corp.

Flynn, "High Efficiency Solid State Neutron Telescope for 15–35 MeV Neutrons", Rev. Sci. Instr., 37 (2), Feb. 1966, pp. 215–222.

Primary Examiner—Alfred E. Smith
Assistant Examiner—Carolyn E. Fields
Attorney, Agent, or Firm—Sughrue, Mion, Zinn, Macpeak & Seas

[57] ABSTRACT

A solid-state neutron detector for detecting both fast and slow neutrons comprises two layers, one of which contains a neutron-sensitive first material and the other of which contains a semiconducting second material containing hydrogen, the first and second materials meeting to form a rectifying junction therebetween. The neutrons are detected by detecting electron-hole pairs migrating in opposite directions relative to the junction. The electron-hole pairs are created by energetic free protons produced by the fast neutrons travelling through the second material and by energetic reaction particles produced by the slow neutrons travelling through the first material. Stacking several of these detectors next to each other enhances overall sensitivity for detecting both fast and slow neutrons.

17 Claims, 7 Drawing Figures

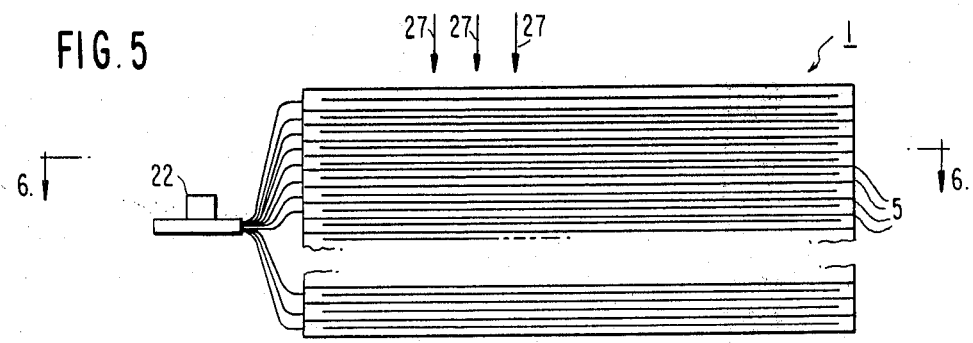
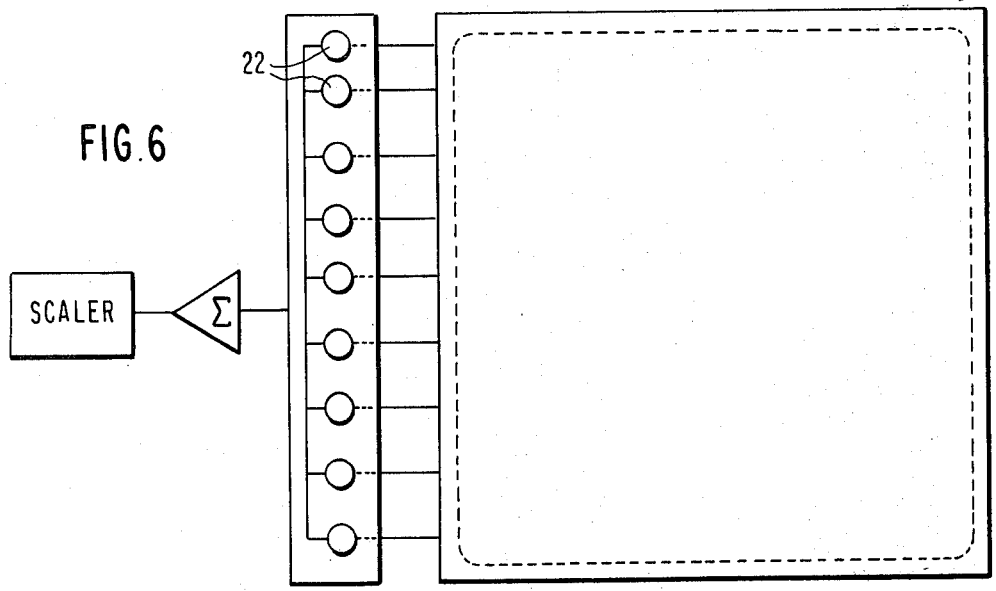
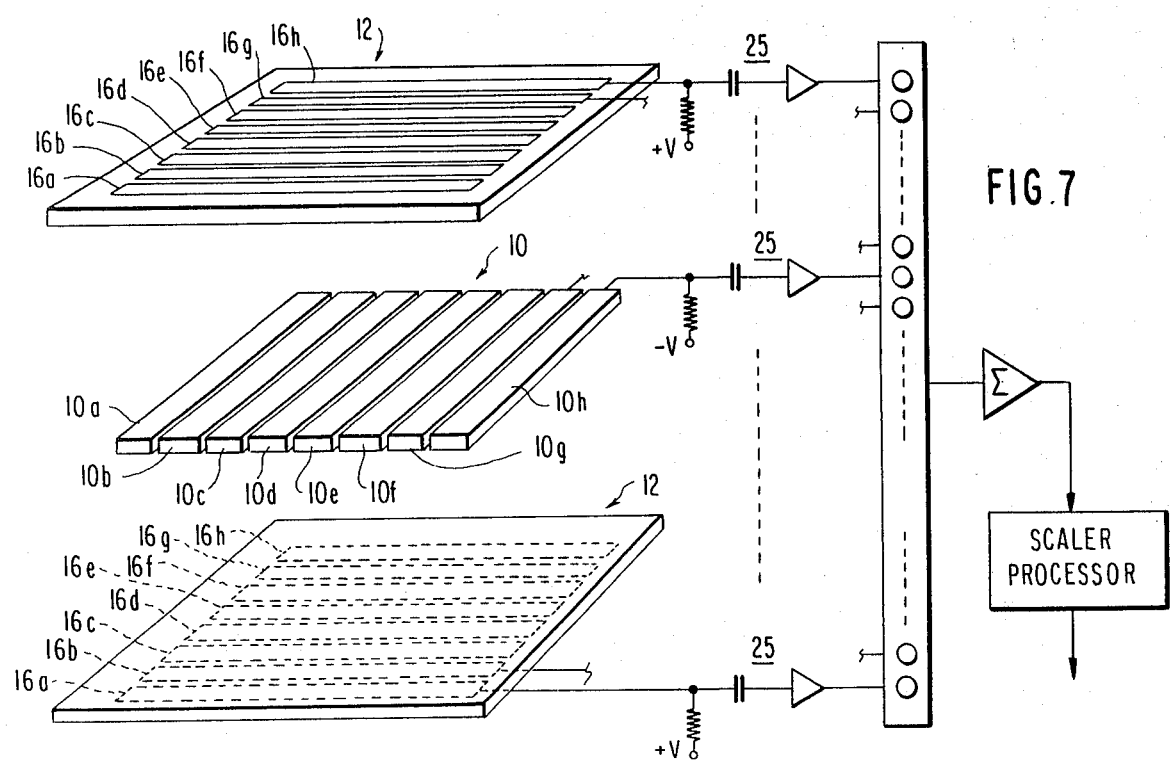

SOLID STATE NEUTRON DETECTOR

BACKGROUND OF THE INVENTION

The present invention relates to neutron detectors which are used to detect neutrons, and more particularly to a new improved solid state detector that is sensitive to both thermal (slow) and fast neutrons.

Current thermal neutron detectors include devices which operate as ionization chambers or proportional counters, both of which use a neutron-active gas such as $B^{10}F_3$ or $He^3$. These materials have a large absorption cross section for thermal neutrons and, upon absorption of a neutron, release energetic reaction particles. These particles produce ionizations in the surrounding gas which are detected by appropriately biased electrodes. Other detectors coat the walls of the ionization chamber with a solid neutron-active material such as $Li^{10}$, $B^{10}$, or $U^{235}$. These materials absorb neutrons and similarly release particles which produce ionizations.

Thermal neutron detectors can be used to detect fast neutrons by surrounding the detector with a moderating hydrogenous material. The moderating material continuously slows the fast neutrons and the detector detects the thermalized neutrons. Various unfolding codes and other techniques have been developed to provide a rough estimate of the original neutron energy distribution.

Ionization chambers are also used in fast neutron detector designs. The detector is designed so that fast neutrons collide with hydrogen thereby creating energetic free protons which produce ionizations detectable by appropriately biased electrodes.

Solid state neutron detectors detect electron-hole pairs that cross a semiconductor junction, the electron-hole pairs being produced by reaction particles formed as a result of neutron absorptions within films or dopants of neutron active material incorporated within the detector. Solid state detectors generally use silicon, germanium, or silicon carbide as a semiconducting material.

Ross, U.S. Pat. No. 3,227,876, describes a silicon solid state semiconductor detector with a p-n junction wherein one of the layers is doped with $B^{10}$, a neutron sensitive material. Incident slow neutrons are absorbed by the boron thereby creating energetic reaction particles which, in turn, create electron-hole pairs that diffuse into and across the junction to produce a current pulse. Reaction particles that backscatter away from the junction often are not detected since these particles either exit the detector without creating a significant number of electron-hole pairs or the electron-hole pairs formed by these particles are too far removed from the junction to migrate across it. To detect fast neutrons, this detector is surrounded by a moderator that slows the neutrons thereby creating thermal neutrons which are then detected. This detector has a low sensitivity per unit volume since the doping of the detector limits the amount of neutron-sensitive material it contains. It also cannot accurately determine the incident neutron energy distribution because of the inherent inaccuracies of present unfolding codes which are required since only moderated thermal neutrons are detected.

Finally, a diamond crystal plate solid-state detector has been used to detect both fast and thermal neutrons. Kozlov, U.S. Pat. No. 3,805,078, describes such a diamond crystal detector. A diamond crystal is expensive, thereby precluding detector designs covering large surface areas, and the diamond crystal tends to polarize since a portion of the electrons and holes migrating through it become trapped.

Other prior art solid state detectors are described in Butler, U.S. Pat. No. 4,000,502; Chung, M. K., "Ge(Li) Surface barrier Detectors for Fast Neutron Spectroscopy", *Journal of the Korean Physical Society*, Vol. 8, No. 1, (March 1975); and Dearnaley, G., "Semiconductor Fast Neutron Detectors", *I.R.E. Transactions on Nuclear Science*, Vol. NS-9, No. 3, (June 1962).

SUMMARY OF THE INVENTION

It is an object of the present invention to overcome the disadvantages of the prior art by providing a solid-state neutron detector that is highly sensitive per unit volume, operable at ambient temperature, capable of indicating accurately the incident neutron energy distribution and direction of travel of the incident neutrons, light in weight, capable of covering a large area, and capable of being made at a modest cost.

A further object of the present invention is to provide a detector capable of simultaneously detecting both fast and thermal neutrons.

A still further object is to provide a neutron detector capable of discriminating against unwanted background signals.

These and other objects are achieved by providing a solid state neutron detector utilizing, in part, a semiconducting material that contains hydrogen. A neutron-sensitive metal is layered on top of the semiconducting material to form a Schottky barrier rectifying junction between the materials. Alternatively, a p-n rectifying junction can be formed if the neutron-sensitive metal is replaced by a second semiconducting material that is itself neutron sensitive or is doped with a neutron-sensitive material. Thermal neutrons are absorbed by the neutron-sensitive material producing energetic reaction particles that subsequently create electron-hole pairs in the semiconducting material. These electron-hole pairs migrate in opposite directions relative to the junction to produce a current pulse across the junction. Fast neutrons collide with the hydrogen in the semiconducting material containing hydrogen, producing energetic free protons that also create electron-hole pairs in the semiconducting material detectable as a current pulse. Electrical circuitry is used to detect these pulses.

Increased sensitivity is achieved when the semiconducting material completely surrounds the neutron-sensitive material.

Even greater sensitivity is achieved when these detectors are stacked in a series arrangement along the direction of travel of the neutrons. When the detectors are stacked, fast neutron collisions can easily be distinguished from thermal neutron absorptions because a fast neutron produces multiple energetic free protons and therefore multiple nearly coincidental pulses.

If the electrical contacts associated with the electrical circuitry and the neutron-sensitive material are arranged in a pattern that forms a grid, the exact location of a neutron collision or absorption can be determined. When the grid pattern is used in the stacked detector arrangement, an indication of the direction of travel of the incident neutrons can also be determined.

Finally the detector can easily discriminate against background signals produced by gamma rays.

BRIEF DESCRIPTION OF THE DRAWINGS

FIG. 5 is a side view of the present invention showing detectors stacked on top of one another;

FIG. 6 is a view of the detector stack in FIG. 5 taken along lines 6—6;

FIG. 7 is an exploded perspective view of a detector with electrical contact strips on the semiconducting layers.

The dimensions in the figures are exaggerated so that particular elements can be easily identified.

DESCRIPTION OF THE PREFERRED EMBODIMENTS

Figure 1:
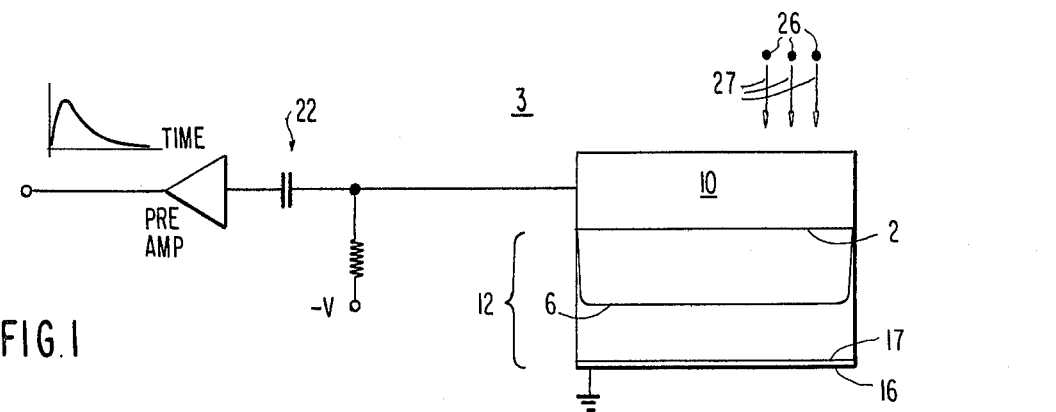
FIG. 1 is a side view of the present invention showing a detector with a neutron-sensitive enriched metal, a semiconducting material, and a Schottky barrier rectifying junction therebetween.
Figure 4:
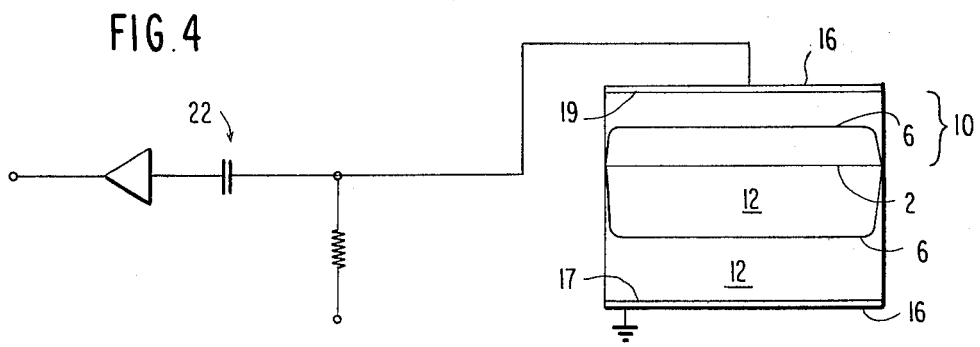
FIG. 4 is a side view of a detector with a p-n rectifying junction instead of a Schottky barrier rectifying junction.

Referring to FIGS. 1 and 4, a detector 3, constructed in accordance with the present invention, has a neutron-sensitive first material 10 layered on top of a semiconducting second material 12 containing hydrogen. The materials 10 and 12 are chosen such that their electronegativities produce a rectifying junction 2 to be formed at the boundary between these materials. When the first material comprises a metal of low electronegativity and the semiconductor is p-type, a Schottky barrier rectifying junction is formed and a depletion layer 6 extends only into the second material 12, as shown in FIG. 1. When the first material 10 comprises a semiconductor of opposite type from the second material 12, a p-n rectifying junction is formed and the depletion layer 6 extends into both the first material 10 and the second material 12 as shown in FIG. 4. The first material may be neutron sensitive or it may be enriched with a third material that is neutron sensitive and may or may not contain hydrogen.

The semiconducting second material 12 can be any straight or branched chain semiconducting hydrocarbon, or it can be hydrogen compensated amorphous silicon or any other semiconductor that contains hydrogen. It may or may not be or contain a neutron-sensitive material. The hydrocarbon may be pure or may be doped with either p-type acceptors or n-type donors.

Methods of preparing rectifying junctions using hydrocarbons are known to those skilled in the art and several techniques for doing this are reported in H. Shirakawa and S. Ikeda, *Polym J.* 2, 231 (1971); T. Ito, H. Shirakawa, and S. Ikeda, *J. Polym. Sci.*, Polym. Chem. Ed. 13, 1943 (1975); Ozali, M., et al., "Junction Formation with Pure and Doped Polyacetylene", App. Phys. Lett., 35: 83–85 (1979).

An ohmic contact 16 is layered onto the outer surface 17 of the second material 12 and on the outer surface 19 (FIG. 4) of the first material 10 when the first material is a non-metal. When the first material is a metal, the surface of the metal itself serves as a contact. A standard charge-sensitive circuit 22 is connected between the contacts on the first and second materials 10 and 12, and no (zero) bias voltage or, if necessary to increase the depletion width and thereby improve collective efficiency, a reverse bias voltage as shown in FIG. 1 is applied.

The detector shown in FIG. 1 operates in the following manner. Incident thermal neutrons 26 traveling in a first direction 27 bombard the first material 10. Assuming lithium, a neutron-sensitive metal, is used as the first material 10, a Schottky barrier rectifying junction is formed between materials 10 and 12 and the following reaction occurs upon a neutron absorption:

$$n + Li^6 \rightarrow H^3(2.73 \text{ MeV}) + He^4(2.05 \text{ MeV}) \qquad (1)$$

The triton ($H^3$) and/or alipha ($He^4$) reaction particles escape from the first material 10 with a portion of their kinetic energy and deposit this energy in the second material 12 which creates electron-hole pairs therein which migrate in opposite directions relative to the junction and are detected as a current pulse across the junction. This pulse is detected by circuit 22. When a p-n rectifying junction is formed between the first and second materials and the first material is also semiconducting, electron-hole pairs are produced in the first material 10 as well.

$Li^6$, $U^{235}$, and $Pu^{239}$ are examples of neutron-sensitive materials that can be used to enrich the semiconductor when it is not itself neutron-sensitive. Many other neutron-sensitive materials can also be used.

Detector 3 is also capable of detecting fast neutrons in addition to thermal neutrons since the semiconducting material contains hydrogen. Hydrogen has a relatively large collision cross-section for fast neutrons when compared with other materials. There is no energy released in these collisions but kinetic energy is imparted to the hydrogen from the neutrons. These collisions produce energetic free protons which deposit their energy directly within the hydrogen containing material producing electron-hole pairs therein detectable as a current pulse.

Figure 2:
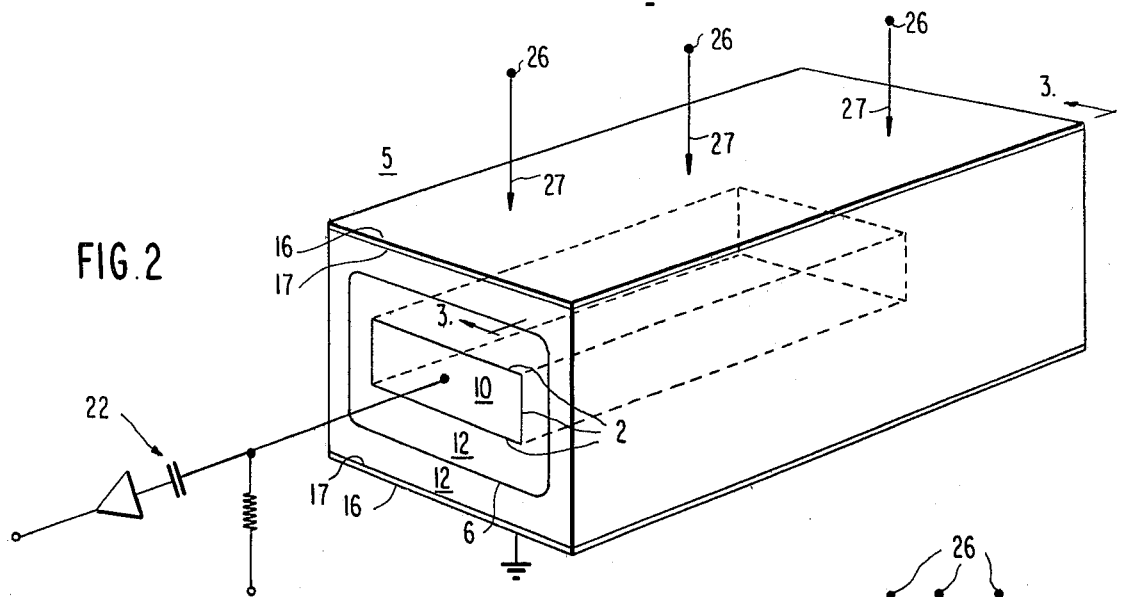
FIG. 2 is a perspective view of the present invention showing a detector wherein the metal is surrounded by the semiconducting material.
Figure 3:
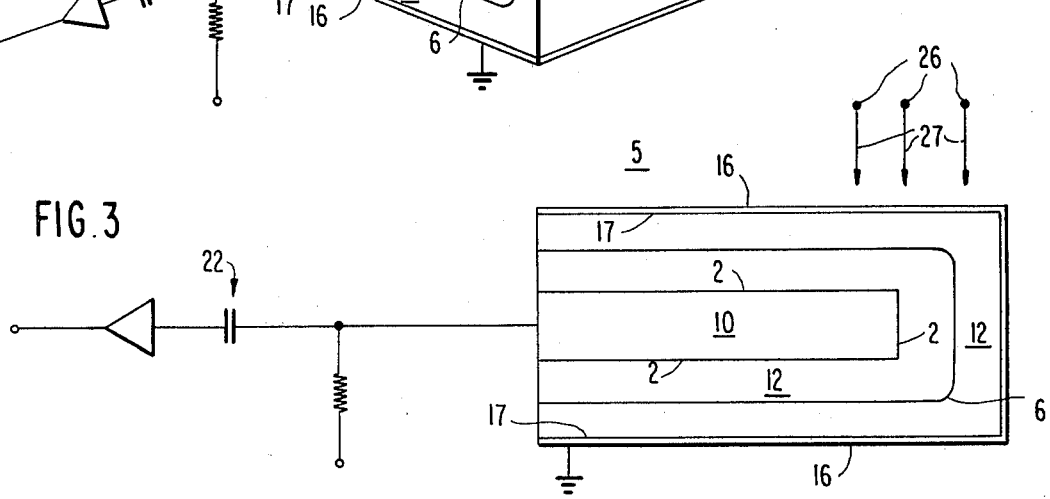
FIG. 3 is a side view of the detector shown in FIG. 2 taken along lines 3—3.

In FIGS. 2 and 3, a detector 5 is shown which is identical to detector 3 except that the second material 12 surrounds the first material 10. As before, the ohmic contact 16 is placed on the outer surface 17 of the second material 12. Surrounding the first material 10 with the second material 12 increases sensitivity because both forward and backscattered reaction particles enter the semiconducting second material 12 and produce electron-hole pairs therein.

Detector 5 operates in the same manner as detector 3 with the exception that incident thermal neutrons must first pass through the second material 12 to reach the first material 10 and then, as in detector 3, these neutrons are absorbed thereby producing reaction particles that, in turn, produce electron-hole pairs in the second material 12. Detector 5, like detector 3, has a low sensitivity to fast neutrons because for practical detectors, the macroscopic neutron cross-section is small because of the thinness of the hydrogen containing layer.

In FIG. 5 and FIG. 6, a composite detector 1 is shown that is made by stacking individual detectors 5, shown in FIGS. 2 and 3, on top of each other in a stacked series arrangement so that an incident neutron travelling in the direction of arrows 27 passes through all the neutron detectors 5 if no absorption or collision occurs. Each individual detector 5 is connected to a separate charge-sensitive circuit 22.

Stacking increases overall sensitivity to both fast and thermal neutrons since stacking increases the macroscopic thermal and fast neutron interaction cross-sections in proportion to the number of detectors in the stack. In addition, a fast neutron is likely to have numerous interactions with the hydrogen contained in the second material 12 as it passes through the stack thereby creating several essentially coincidental pulses which uniquely identify a fast neutron interaction.

Some information as to the incident direction of travel of the neutron is provided as follows. A subdivided, multiple electrode grid arrangement readily provides a means of determining the location of a neutron interaction. In FIG. 7, one grid arrangement is shown comprising a contact 16 which is shown layered onto the outer surfaces of the second material 12. For definiteness we consider a Schottky barrier detector utilizing Li-6 which functions like that shown in FIG. 2.

Contact 16 comprises numerous parallel ohmic contact strips 16a, 16b, 16c, etc. Rather than being a sheet of continuous material, the first material 10 comprises numerous parallel strips 10a, 10b, 10c, etc., oriented perpendicular to the direction of the ohmic contact strips 16a, 16b, 16c, etc., thereby forming a grid. Provided charge-sensitive circuits 25 are connected to each and every strip, this arrangement subdivides the detector into a grid so that the signals detected, with appropriate processing, provide a means for determining the exact site of a neutron interaction, and an "image" of the incident neutron flux interactions in each layer can thus be obtained. Of course other grid arrangments other than the rectangular grid shown in FIG. 7 could just as easily be used. Concentric annular circles and a plurality of straight strips, all of which pass through the common center of the circles, would be one such arrangement.

UNFOLDING TECHNIQUES

If a grid is not used, some information on the incident neutron direction of travel and energy is available because of the stacked detector arrangement. Unfolding codes for each detector design can be developed based on detailed general kinetic analysis of all possible neutron interactions in an attempt to achieve a best fit to the observed signal amplitudes, the time ordered sequence of signals and origin of the interaction sites. It is intuitively clear, however, that elementary analysis results in some direct discrimination. For example, if a neutron enters a detector stack perpendicular to the planes of materials 10 and 12, a sequence of decreasing amplitude time ordered signals should be observed proceeding through the detector stack in the direction of the incident neutron. Similarly, if the neutron enters the stack parallel to the planes of these materials, a sequence of decreasing amplitude time ordered signals should be observed in the same or nearby detector layers. Other incident direction effects are a combination of these two extremes.

Various unfolding codes can also be applied to the data produced by signals from circuits 22 to determine the energy distribution of the incident neutron flux. Since the response of the detector stack to an incident fast neutron is statistical in nature and dependent upon the details of the detector design, an exact unfolding or inversion of the neutron energy is not possible. A detailed Monte Carlo analysis of the detector performance or empirical measurements can provide a statistical distribution response function that can be used as the basis of an unfolding code yielding an estimate of the neutron energy distribution.

Assuming the detector statistical response function for a fast neutron is known, a simple unfolding code begins by determining the average value S for the signal amplitudes created by the electron-hole pairs, which is:

$$S = S(E_n, P, M) \tag{2}$$

where S is a function of the incident neutron energy $E_n$, momentum P, and material parameters M. If the direction of the neutron is known (if it is unknown, the following result must be averaged over all directions), to a first approximation the signal caused by an incident neutron is:

$$S = S(0, P_0, M) + E_n \frac{dS(0, P_0, M)}{dE} + \ldots \tag{3}$$

$$\simeq E_n \frac{dS(0, 0, M)}{dE} = \alpha E_n \tag{4}$$

since it is physically required that $S(0, 0, M) = 0$, $\alpha$ is a constant, and $P_0$ is the neutron momentum, i.e., to the first order, the individual detector signal amplitudes are expected to be proportional to the incident neutron energy.

The data from a thick stacked detector can be analyzed on the basis of the individual detector characteristics as given approximately in equation (4). For example, if the total thickness of the semiconductor containing hydrogen is at least one neutron scattering length, a neutron-proton collision is likely somewhere in the stack. Shortly thereafter, within a few nanoseconds for a 2 MeV neutron, a second, third, ... series of electronic signals result. Because of the relatively large fast neutron scattering length compared with individual detector thicknesses, these signals are likely to occur in different detectors and certainly occur in a rapid, well-ordered time sequence. The near coincidence of the signals can be used to distinguish these fast neutron-induced multiple signals from random background signals and thermal neutron signals. As an obvious extension of equation (4), if m signals from the sequence are available, a statistical estimate of the incident neutron energy is:

$$E_n \lesssim \frac{1}{m} \sum_{i=1}^{m} \frac{S_i}{\alpha_i} \tag{5}$$

where $S_i$ is the $i^{th}$ signal amplitude in the sequence an $\alpha_i$ is the appropriate proportionality constant, likely determined by empirical measurement.

This procedure is only one approximate unfolding code. More sophisticated unfolding codes could utilize the actual distribution functions of the signals rather than their average values. Also, if the stacked detector is sufficiently fast, the time ordered sequence of signals would be available and could provide additional information. For example, on the average, the time ordered sequence of signals should monotonically decrease in amplitude because the neutron has less kinetic energy after each interaction. The average energy decrement loss during each collision is estimated from well known statistical analysis of kinematic neutron-proton collisions and is:

$$E_{p,i} = E_{n,0}(1 - e^{-1})e^{-(i-1)} \tag{6}$$

where i=1,2, ..., $E_{n,0}$ is the incident neutron energy before any collisions, $E_{n,i-1}$ is the incident neutron energy immediately before the ith collision and $E_{p,i}$ is the energy of the resultant proton created by the ith collision which produces a signal in the detector. Utilizing equation (6) and equation (4), an estimate of the neutron energy from the $i^{th}$ signal is:

$$E_{n,0} = \frac{S_i e^{(i-1)}}{\alpha_i(1 - e^{-1})} \qquad (7)$$

where $E_{n,0}$ is the initial neutron energy and $S_i$ and $\alpha_i$ are the $i^{th}$ signal amplitude and weight factor respectively. If m such signals are available, another statistical estimate of the incident neutron energy is found by averaging the signals:

$$E_n \gtrsim \frac{1}{m(1 - e^{-1})} \sum_{i=1}^{m} \frac{S_i}{\alpha_i} e^{(i-1)} \qquad (8)$$

Clearly there are variations of these schemes and others which can be applied to estimate the neutron energy.

DESIGN CONSIDERATIONS

To develop an optimized detector design, a detailed Monte Carlo calculation of the neutron and reaction particle transport effects is required.

The precise thickness of the first and second materials 10 and 12 requires consideration of several parameters that are dependent on the materials chosen. The thickness of the first material 10 should be thick enough to absorb as many incident thermal neutrons as possible, but thin enough to allow the energetic reaction particles produced by neutron interactions to escape from material 10 into material 12 with a reasonable amount of their initial kinetic energy. The second material 12 must be thick enough to absorb the kinetic energy of the energetic reaction particles, but thin enough to have high enough quality that a near fully-depleted depletion layer 6 can be produced thus allowing the electron-hole pairs to migrate with little loss.

Thermal neutrons incident on the first material 10 are absorbed with a probability determined by the absorption cross section and thickness of material 10. These absorptions produce reaction particles which have some probability of escaping the material 10 with a fraction of their initial energy. The probability of a reaction particle escaping, and its energy if it does so, are both dependent on the type of material 10 chosen and the exact site of the neutron absorption.

Once the thickness and composition of material 10 is chosen, the Monte Carlo calculation can be performed to determine the effective absorption probability, $P_a$, that a neutron will be absorbed. This calculation can also determine the average escape energy, E, of the reaction particle created by the absorption. Knowing $P_a$ and E, the design of the detector and its performance can be estimated.

The second material 12 should be thick enough to absorb most of the energy of the energetic reaction particles. A reasonable thickness is the unattenuated range, L, of a reaction particle that escapes from the first material 10 with all of its initial kinetic energy. This is a conservative design since the unattenuated range is certainly greater than that of the average.

With the thickness of both materials 10 and 12 fixed, other parameters are constrained. For example, to ensure efficient charge collection when a Schottky barrier rectifying junction is used, the semiconducting material, material 12, should be fully depleted. Neglecting thermal effects, the necessary degree of compensation in material 12, $N_a - N_b$, and/or externally applied bias, V, are obtained from the standard Schottky junction depletion width expression:

$$L \gtrsim \frac{K E_o (\Phi_\beta + V)}{e (N_a - N_b)} \qquad (9)$$

where K is the dielectric constant of material 12, $E_o$ the permittivity constant, $\Phi_\beta$ the built-in voltage, e the elementary electron charge, and L the unattenuated range of the reaction particle in material 12. Similarly, the life time for the electron-hole pairs is given by the minimum time reqired for an electron or hole to drift through the entire depletion layer under the influence of the internal voltage. If, for a first approximation, a uniform internal electric field is assumed, this condition reduces to:

$$Y\mu \gtrsim L^2/(\Phi+V) \qquad (10)$$

where Y is the electron-hole lifetime, and $\mu$ is the mobility of the electron or hole, assumed to be the same for the electron and hole. From Eq. 2 it is seen that if $L^2$ increases, the product of the lifetime Y and the mobility $\mu$ must increase.

The "average" response of the detector after a neutron absorption can also be estimated. The energy deposited in the semiconductor quickly decays into electron-hole pairs with approximately one band gap energy. As confirmed by past semiconductor detector experience, it requires about three band gaps of energy to create an electron-hole pair. Thus the total electron or hole charge generated in the depleted semiconductor is:

$$\Delta Q \approx (eE_d/3E_\beta) \qquad (11)$$

where $\Delta Q$ is the electron or hole charge generated, $E_d$ is the energy deposited, $E_\beta$ the band gap energy and e the elementary electron charge. Because of the good electron-hole lifetime and mobility, the electron-hole pairs will accelerate to opposite sides of the detector with little loss, producing a current pulse. Clearly the maximum expected charge in that current pulse is given by Eq. 11. An estimate of the voltage signal available from the detector can be obtained from elementary circuit analysis.

Considering, as one example, a $CH_3(CH)_xCH_3$-$Li^6$ detector, there are two reaction particles created per neutron interaction, a triton particle and an alpha particle. The ranges of the reaction triton and alpha in metallic lithium are about 135$\mu$ and 28$\mu$, respectively. The unattenuated range of the reaction triton and alpha in $CH_3(CH)_xCH_3$ is almost the same, about 140$\mu$ and 27$\mu$ respectively. Detectors can be optimized to detect either or both reaction particles.

A Type I design, optimized to detect the reaction triton, should have a lithium thickness that is less than the range of the triton but as thick as possible to maximize the neutron absorption. A detailed calculation by W. E. Selph & S. L. Friesenhahn in *IRT* 8169-004, "An Investigation of Parallel Plate Neutron Detector Concepts", June 27, 1978, IRT Corporation, San Diego, CA, shows the escape fraction of tritons and alphas from a 50μ layer of 90% $Li^6$ to be about 0.8 and 0.2 respectively. An average escape energy of these particles is assumed to be one-half its reaction energy or about 1.4 MeV. Choosing the $CH_3(CH)_xCH_3$ thickness to be the range of the unattenuated triton, 140μ, one can use Monte Carlo techniques to calculate the Type I detector performance characteristics as shown on the left side of Table I.

TABLE I

Comparison of the physical parameters and predicted performance characteristics of Type I and II, $CH_3(CH)_xCH_3$—$Li^6$ detectors. A band gap of 1.48 eV and dielectric constant of 2 has been assumed for $CH_3(CH)_xCH_3$. The voltage estimate is for a 1 $cm^2$ detector.

|  | Type I Design | Type II Design |
|---|---|---|
| Lithium Thickness | 50μ | 14μ |
| $CH_3(CH)_xCH_3$ Thickness | 140μ | 27μ |
| Total Thickness | 0.33 mm | 0.07 mm |
| $P_a$ (90% enriched with Li-6) | 0.37 | 0.16 |
| ΔQ | $4.1 \times 10^5$ e | $3.5 \times 10^5$ e |

A Type II design, optimized to detect the reaction alpha, should have a lithium thickness that is thin enough to allow a reasonable probability of escape for the reaction alpha. Correspondingly, the $CH_3(CH)_xCH_3$ thickness can be thin because the range of the unattenuated alpha in this material is only about 27μ. Reducing the lithium layer to 14μ and the thickness of the $CH_3(CH)_xCH_3$ layer to the range of the unattenuated alpha in $CH_3(CH)_xCH_3$, 27μ, the Type II detector performance characteristics can be calculated and are shown on the right side of Table I.

The properties needed to create a completely depleted semiconductor layer and collect the induced free charge are given for both types of detectors in Table II for two typical values of $N_a - N_b$. The penalty for the Type II design is reduced neutron absorption per detector. This does not significantly change the sensitivity per unit volume of detector, which is determined by the lithium per unit volume, but does require the use of multiple detectors in a stacked series arrangement.

TABLE II

Comparison of the electronic parameters of the polymeric semiconducting material for Type I and II $CH_3(CH)_xCH_3$—$Li^6$ composite detectors. The internal Schottky barrier induced voltage is assumed to be 0.5 volts.

|  | TYPE I DESIGN | TYPE II DESIGN | TYPE I DESIGN | TYPE II DESIGN |
|---|---|---|---|---|
| $N_a$-$N_b$ ($Cm^{-3}$) | $10^{12}$ | $10^{12}$ | $10^{10}$ | $10^{10}$ |
| V (Volts) | 210 | 7.3 | 1.6 | 0 |
| Tμ ($cm^2/v$) | $9.3 \times 10^{-7}$ | $9.3 \times 10^{-7}$ | $9.3 \times 10^{-5}$ | $1.5 \times 10^{-5}$ |

The discrimination of background gamma ray signals from these detectors should not be a problem. The kinetic energy of Compton electrons produced from gamma ray interactions typically range between 200-600 KeV. Using an average electron stopping power of 2 MeV g-$^1cm^2$, the energy deposited in 140μ of $CH_3(CH)_xCH_3$ is about 10 KeV, much smaller than the deposited energy from a neutron absorption.

As seen from the estimated effective absorption probabilities, $P_a$, in Table I, a single detector does not absorb all incident thermal neutrons. For many applications multiple or stacked detectors would increase overall sensitivity. The individual detectors are quite thin for the Type I design, a little more than 0.3 mm. Therefore, a stack of three, which absorbs about 70% of a thermal neutron flux, is no more than one millimeter thick.

If fast neutron detection is desirable, even thicker stacks can be made. The hydrogen in the $CH_3(CH)_xCH_3$ moderates fast neutrons producing both thermal neutrons that will be absorbed in the $Li^6$ and also energetic free protons that deposit their kinetic energy in the $CH_3(CH)_xCH_3$. This latter effect is quite useful for not only counting fast neutrons but also for determining their energy as described previously.

Although the $CH_3(CH)_xCH_3$-$Li^6$ detector described above is not the only, or perhaps even the best combination of materials, it has several attractive properties which recommend it. Based on already known processes, high quality $CH_3(CH)_xCH_3$ films can be formed by catalytic polymerization of acetylene gas onto metallic surfaces. Also, metal films are known to form good junctions with $CH_3(CH)_xCH_3$. A film of $CH_3(CH)_xCH_3$ has been determined to be intrinsically p-type and can be easily compensated to very low net charge levels by exposure to $NH_3$ gas. These properties mean that the detector can be produced by simple evaporation and gas exposure techniques.

The first reported measurement of the product, Yμ, for $CH_3(CH)_xCH_3$, reported by T. Tani et al. in "Phototransport Effects in Polyacetylene (Ch$_3$)", Sol. St. Comm. Vol 33, pp. 490-503 (1980), is about $10^{-10}$ $cm^2/V$. Though this value is not very satisfactory from an operational standpoint, it is sufficient for these detectors to function. In order to do so with such a low product for Yμ, the thickness of the $CH_3(CH)_xCH_3$ would have to be reduced in order to achieve efficient charge collection. The detectors can utilize a $CH_3(CH)_xCH_x$ thickness less than those chosen for the calculations in Table II since the thickness used for those calculations was conservatively chosen and was based on the unattenuated range L of the reaction particles.

Band structure calculations indicate $CH_3(CH)_xCH_3$ is an indirect band gap material, implying it should have long carrier lifetimes. Typical values for Yμ for other well developed indirect band-gap semiconductors are $10^{-5}$ $cm^2/V$ for cadmium and unity for silicon, hence, it is reasonable to expect improvements in this parameter for $CH_3(CH)_xCH_3$. Studies further indicate that anisotropy in the electrical conductivity exists with greatly increased conductivity (and mobility) in the direction of the fibrils. If the detector can be fabricated with the fibrils oriented perpendicular to the metal film, the enhanced mobility would be in the desired orientation and would significantly improve the performance of the detector.

Larger electronegativity metals, such as $U^{235}$ and/or $Pu^{239}$, can be used for the neutron active layer. These materials have a large thermal neutron cross section similar to $Li^6$, 580 barns for $U^{235}$ compared with 940 barns for $Li^6$. More importantly, the energy release of $U^{235}$ neutron capture is over 200 Mev, about two orders of magnitude greater than $Li^6$. The fission fragments created by $U^{235}$ have a small range and therefore the $CH_3(CH)_xCH_3$ can be very thin, reducing the need entirely for a large depletion width and long carrier lifetime. Thus, such a detector could produce more signals and be easier to fabricate than the CH$_3$(CH)$_x$CH$_3$-Li$^6$ composite.

It is obvious to those skilled in the art that numerous additional possible design alternatives can be used in building a detector in accordance with the present invention and the specific possibilities given above are not intended to limit the scope of the present invention.

I claim:

1. A neutron detector for detecting neutrons travelling in at least a first direction and comprising at least one neutron detecting assembly, said neutron detecting assembly comprising:
   a neutron-sensitive first material which produces energetic reaction particles when bombarded by neutrons;
   a semiconducting second material forming a rectifying junction with said first material and containing hydrogen, said second material producing energetic free protons when bombarded by neutrons, said second material also producing electron-hole pairs as a result of energy deposited therein by said reaction particles and free protons, said electron-hole pairs migrating in opposite directions relative to said junction to produce an electrical current across said junction; and
   means for measuring said electrical current flowing across said junction.

2. A detector as claimed in claim 1 further comprising means for biasing said junction in order to almost fully deplete said second material.

3. A detector as claimed in claim 2 further comprising at least one additional neutron detecting assembly, said assemblies being stacked on top of each other so that each assembly is in the path of a neutron travelling in said first direction.

4. A detector as claimed in claim 3 further comprising subdivided, multiple electrode means for determining the point of origin of said free protons and said reaction particles.

5. A detector as claimed in claim 4 wherein said first material in each said assembly is surrounded by a corresponding second material.

6. A detector as claimed in claim 1 wherein said first material is a semiconducting non-metal thereby creating a p-n rectifying junction between said first and second materials.

7. A detector as claimed in claim 1, wherein said first material is a metal thereby creating a Schottky barrier rectifying junction between said first and second materials.

8. A detector as claimed in claim 1, 6 or 7, wherein said second material comprises hydrogen compensated amorphous silicon.

9. A detector as claimed in claim 1, 6 or 7 wherein said second material comprises a straight or branched chain semiconducting hydrocarbon.

10. A method of detecting neutrons travelling in at least a first direction, comprising the steps of:
    generating energetic reaction particles by disposing at least one neutron-sensitive first material in the path of said neutrons travelling in said first direction;
    generating energetic free protons by disposing at least one semiconducting second material containing hydrogen in said path of said neutrons travelling in said first direction, said second material forming a rectifying junction with said first material;
    generating electron-hole pairs in said second material as a result of energy deposited therein by said reaction particles and free protons, said electron-hole pairs migrating in opposite directions relative to said junction thereby producing an electrical current across said junction; and
    measuring said electric current flowing across said junction.

11. A method of detecting neutrons as claimed in claim 10 further comprising the step of biasing said junction in order to almost fully deplete said second material.

12. A method of detecting neutrons as claimed in claim 11 further comprising the step of disposing a plurality of said first and second materials in said paths of said neutrons travelling in said first direction, each first material being surrounded by a corresponding second material.

13. A method of detecting neutrons as claimed in claim 12 further comprising the step of determining the point of origin of said reaction particles and free protons.

14. A method of detecting neutrons as claimed in claim 10, further comprising the step of creating a Schottky barrier rectifying junction between said first and second materials by forming said first material from a metallic material.

15. A method of detecting neutrons as claimed in claim 10, further comprising the step of creating a p-n rectifying junction between said first and second materials by forming said first material from a semiconducting non-metal material.

16. A method of detecting neutrons as claimed in claim 10, 14 or 15, further comprising the step of forming said second material from a straight or branched chain hydrocarbon material.

17. A method of detecting neutrons as claimed in claim 10, 14 or 15, further comprising the step of forming said second material from a hydrogen compensated amorphous silicon material.

* * * * *